US005900207A

United States Patent [19]
Danforth et al.

[11] Patent Number: 5,900,207
[45] Date of Patent: May 4, 1999

[54] SOLID FREEFORM FABRICATION METHODS

[75] Inventors: Stephen C. Danforth, Belle Mead; Mukesh Agarwala, Highland Park; Amit Bandyopadghyay, Edison; Noshir Langrana, Robbinsville; Vikram R. Jamalabad, Somerville; Ahmad Safari, Princeton Junction; Remco van Weeren, Highland Park, all of N.J.; William R. Priedeman, Jr., Wayzata, Minn.

[73] Assignees: Rutgers, the State University Old Queens, New Brunswick, N.J.; Stratasys, Inc., Eden Prairie, Minn.

[21] Appl. No.: 08/858,965

[22] Filed: May 20, 1997

Related U.S. Application Data

[62] Division of application No. 08/598,276, Feb. 8, 1996, Pat. No. 5,738,817.

[51] Int. Cl.⁶ .............................. B29C 41/02; C04B 35/00
[52] U.S. Cl. .......................... 264/603; 264/255; 264/308; 264/604; 264/678; 364/468.26; 419/1; 419/5; 419/36
[58] Field of Search ..................................... 264/255, 308, 264/603, 604, 678; 364/468, 26; 419/1, 5, 36

[56] References Cited

U.S. PATENT DOCUMENTS

| 5,121,329 | 6/1992 | Crump | 364/468.26 |
| 5,340,433 | 8/1994 | Crump | 264/401 X |

OTHER PUBLICATIONS

Merz et al., "Shape Deposition Manufacturing", 5th Solid Freeform Fabrication Symposium Proceedings, edited by H.L. Marcus, J.J. Beaman, J.W. Barlow, D.L. Bourell, R.H. Crawford, Univ. of Texas, Austin, TX, 1994, pp. 1–8.

Nelson, et al., "Post–Processing of Selective Laser Sintered Polycarbonate Parts", 2nd Solid Freeform Fabrication Symposium Proceedings, edited by H.L. Marcus, J.J. Beaman, J.W. Barlow, D.L. Bourell, R.H. Crawford, Univ. of Texas, Austin, TX, 1991, pp. 75–85.

Comb, et al., "Control Parameters and Material Selection Criteria for Rapid Prototyping Systems", 4th Solid Freeform Fabrication Symposium Proceedings, edited by H.L. Marcus, J.J. Beaman, J.W. Barlow, D.L. Bourell, R.H. Crawford, Univ. of Texas, Austin, TX, 1993, pp. 86–91.

Crawford, R.H., "Computer Aspects of Solid Freeform Fabrication: Geometry, Process Control, and Design", 4th Solid Freeform Fabrication Symposium Proceedings, edited by H.L. Marcus, J.J. Beaman, J.W. Barlow, D.L. Bourell, R.H. Crawford, Univ. of Texas, Austin, TX, 1993, pp. 102–112.

Makela, I., "Some Efficient Procedures for Correcting Triangulated Models", 4th Solid Freeform Fabrication Symposium Proceedings, edited by H.L. Marcus, J.J. Beaman, J.W. Barlow, D.L. Bourell, R.H. Crawford, Univ. of Texas, Austin, TX, 1993, pp. 126–134.

Johanson, et al., Homogenization Design and Layered Manufacturing of a Lower Control Arm in Project Maxwell, 4th Solid Freeform Fabrication Symposium Proceedings, edited by H.L. Marcus, J.J. Beaman, J.W. Barlow, D.L. Bourell, R.H. Crawford, Univ. of Texas, Austin, TX, 1993, pp. 186–192.

Agarwala, et al., "An Evaluation of the Mechanical Behavior of Bronze–NI Composites Produced by Selective Laser Sintering", 5th Solid Freeform Fabrication Symposium Proceedings, edited by H.L. Marcus, J.J. Beaman, J.W. Barlow, D.L. Bourell, R.H. Crawford, Univ. of Texas, Austin, TX, 1994, pp. 1–8.

Walters, W., "Rapid Prototyping Using FDM: A Fast, Precise, Safe Technology", 3rd Solid Freeform Fabrication Symposium Proceedings, edited by H.L. Marcus, J.J. Beaman, J.W. Barlow, D.L. Bourell, R.H. Crawford, Univ. of Texa, Austin, TX, 1992, pp. 301–308.

Edirisinghe, et al., "Compounding Ceramic Powders Prior to Injection Molding", Proc. Brit. Cerum Soc., vol. 38, 1986.

Comb, et al., "FDM Technology Process Improvements", 5th Solid Freeform Fabrication Symposium Proceedings, edited by H.L. Marcus, J.J. Beaman, J.W. Barlow, D.L. Bourell, R.H. Crawford, Univ. of Texas, Austin, TX, 1994, pp. 42–49.

Agarwala, et al., "Structural Ceramics by Fused Deposition of Ceramics", Proceedings of the Solid Freeform Fabrication Symposium, Aug. 1995.

van Weeren, et al., "Quality of Parts Processed by Fused Deposition", Proceedings of the Solid Freeform Fabrication Symposium, Aug. 1995.

Bandyopadhyay, et al., "Injection–molded Ceramics: Critical Aspects of the Binder Removal Process and Component Fabrication", *Journal of the European Ceramic Society*, vol. 11, 1993, pp. 23–34.

Guduri, et al., "Direct Generation of Contour Files from Constructive Solid Geometry Representations", 4th Solid Freeform Fabrication Symposium Proceedings, edited by H.L. Marcus, J.J. Beaman, J.W. Barlow. D.L. Bourell, R.H. Crawford, Univ. of Texas, Austin, TX, 1993, pp. 291–302.

Wohlers, T.T., "Plastic Models in Minutes", *Cadence*, Jul. 1990.

(List continued on next page.)

*Primary Examiner*—Leo B. Tentoni
*Attorney, Agent, or Firm*—Moore & Hansen

[57] ABSTRACT

A fused deposition process is used to form three-dimensional solid objects from a mixture including a particulate composition dispersed in a binder. The article is formed by depositing the mixture in repeated layers of predefined thickness, with each layer solidifying before the next adjacent layer is dispensed. Following formation and a binder removal step, the article may be at least partially densified to achieve preselected properties. The process permits three-dimensional articles to be formed relatively quickly and inexpensively, without the need for molds or other tooling.

13 Claims, 3 Drawing Sheets

OTHER PUBLICATIONS

Edirisinghe, et al., "Systematic Development of the Ceramic Injection Moulding Process", *Materials Science and Engineeering,* 1989, pp. 17–26.

Tsao, et al., Injection Moldable Ceramic–Ceramic Composites: Compounding Behavior, Whisker Degradation, and Orientation, *American Ceramic Society Bulletin,* vol. 72, No. 2, Feb. 1993, pp. 55–67.

Shaw, et al., "Removal of Binder from Ceramic Bodies Fabricated Using Plastic Forming Methods", *American Ceramic Society Bulletin,* vol. 72, No. 9, Sep. 1993, pp. 94–99.

German, R.M., "Theory of Thermal Debinding", *The International Journal of Powder Metallury,* vol. 23, No. 4, pp. 237–245.

Shukla, et al., "Binder Evolution from Powder Compacts: Thermal Profile for Injection–Molded Articles", *Journal of the American Ceramic Society,* vol. 72, No. 10, 1989, pp. 1797–1803.

Cima, et al., "Binder Distribution in Ceramic Greenware During Thermolysis", *Journal of the American Ceramic Society,* vol. 72, No. 7, 1989, pp. 1192–1199.

Barone, et al., "Liquid–Phase Transport During Removal of Organic Binders in Injection–Molded Ceramics", *Journal of the American Ceramic Society,* vol. 73, No. 11, 1990, pp. 3323–3333.

Bao, et al., "Kinetics of Capillary Extraction of Organic Vehicle from Ceramic Bodies. Part I: Flow in Porous Media", *Journal of the European Ceramic Society,* vol. 8, 1991, pp. 81–93.

Sakellariou, et al., "Plasticization of Aqueous Poly (Vinyl Alcohol) and Hydroxypropyl Methylcellulose with Polyethylene Glycols and Glycerol", *European Polym. Journal,* vol. 29, No. 7, 1993, pp. 937–943.

Han, et al., "Effects of Titanate Coupling Agents on the Rheological and Mechanical Properties of Filled Polyolefins", *Polymer Engineering and Science,* vol. 18, No. 11, Aug. 1978, pp. 849–854.

Arkles, B., "Tailoring Surfaces with Silanes", *Chemtech,* vol. 7, Dec. 1977, pp. 766–778.

Quackenbush, et al., "Fabrication of Sinterable Silicon Nitride by Injection Molding", *Ceramic Engineering Science Proc.,* vol. 3, 1982, pp. 20–34.

Edirisinghe, M.J., "Fabrication of Engineering Ceramics by Injection Molding", *Ceramic Bulletin,* vol. 70, No. 5, 1991, pp. 824–828.

Edirisinghe, et al., "Properties of Ceramic Injection Moulding Formulations", *Journal of Material Science,* 1987, vol. 22, pp. 269–277.

Sushumna, et al., "Effective Dispersants for Concentrated, Nonaqueous Suspensions", *J. Mater. Res.,* vol. 7, No. 10, Oct. 1992, pp. 2884–2893.

Saitoh, K., "Injection Molding of Fine Ceramics", *Techno Japan,* vol. 19, No. 8, Aug. 1986, pp. 52–62.

Bezzel, et al., "Injection Molding of Silicon Nitride", *Key Engineering Materials,* vol. 89–91, 1994, pp. 689–692.

Tsao, et al., "Rheological Behavior of Injection–Moldable Silicon Powder–Silicon Carbide Whisker Formulations", *Journal of the American Ceramic Society,* vol. 76, No. 12, 1993, pp. 2977–2984.

Clash, et al., "Vinyl Elastomers Low–Temperature Flexibility Behavior", *Industrial and Engineering Chemistry,* vol. 34, No. 10, Oct. 1942, pp. 1218–1222.

Zhang, et al., "The Use of Silane Coupling Agents in Ceramic Injection Moulding", *Journal of Material Science,* vol. 23, 1988, pp. 2115–2119.

Monte, et al., "Processing of Composites with Titanate Coupling Agents—A Review", *Polymer Engineering and Science,* vol. 24, No. 18, Dec. 1984, pp. 1369–1381.

SOLID FREEFORM FABRICATION METHODS

This application is a division of Application Ser. No. 08/598,276 filed Feb. 8, 1996 and and now issued as U.S. Pat. No. 5,738,817.

The U.S. Government has a paid-up license in this invention and the right in limited circumstances to require the patent owner to license others on reasonable terms as provided for by the terms of Contract No. N00014-94-C-0115 awarded by the Office of Naval Research.

FIELD OF THE INVENTION

The present invention is generally related to the fabrication of three-dimensional components without the use of molds, dies, or other shape-producing tool. More particularly, the present invention relates to the use of freeform fabrication techniques to produce three-dimensional functional components from particulate-filled binder systems. Still more particularly, the present invention relates to the fabrication of net-shape ceramic, metallic, polymeric or mixed components using freeform fabrication techniques.

BACKGROUND OF THE INVENTION

Methods for forming three-dimensional ceramic and metallic articles having a predetermined size and shape are known. Most conventional of these methods are the various pressing and extrusion techniques and, for more complex shapes, injection molding. Because of the time needed to produce the tooling required for such processes and the high initial cost of that tooling, these production techniques typically require long lead times and result in high unit manufacturing costs, particularly for the manufacture of prototypes or for small quantity production runs.

Recently, various solid free form fabrication techniques have been developed for producing three-dimensional articles without the need for molds, dies or other tooling. One such technique, commercialized by Stratasys, Inc. of Eden Prairie, Minn., and referred to as Fused Deposition Modeling (FDM™), builds solid objects layer by layer from polymer/wax compositions by following the signals generated by a computer-aided design (CAD) software program. According to this technique, described in U.S. Pat. No. 5,121,329, the disclosure of which is hereby incorporated by reference herein, a flexible filament of the polymer/wax composition is fed by a pair of counter-rotating rollers into a dispensing head including a liquifier and a nozzle outlet. Inside the liquifier, the filament is heating to a temperature just above its melting point where it softens and melts. As the counter-rotating rollers continue to advance the solid filament into the liquifier, the force of the incoming solid filament extrudes the molten material out from the nozzle where it is deposited on a build platform positioned in close proximity to the dispensing head. The CAD software controls the movement of the dispensing head in the horizontal X-Y plane and controls the movement of the build platform in the vertical Z direction. By controlling the processing variables, the extruded bead, called a "road", can be deposited layer by layer in areas defined from the CAD model, leading to the creation of a three-dimensional object that resembles the CAD model.

As noted, the fused deposition modeling process described above has been used to fabricate three-dimensional objects from wax and polymer materials. The primary applications of this technology have been the manufacture of prototypes and the creation of positive forms to be used in investment casting processes. Accordingly, the users of the fused deposition modeling process have heretofore been concerned primarily with the external dimensional accuracy of the part formed and, to a lesser extent, with the exterior surface finish of the final part. As a result, little attention has been paid to the internal integrity of parts built by FDM techniques, and particularly to the elimination of internal defects which might limit the mechanical properties of solid parts built by these techniques. This is particularly the case in fabricating ceramic, metallic or ceramic/metallic parts, where the presence of internal defects such as voids, knit lines, laminations and the like will have a detrimental effect on the mechanical, electrical, optical, magnetic, magneto-optical and other properties of the final product.

The use of solid particle filled material in fused deposition modeling processes raises difficulties not addressed by the prior art. Among these concerns is the need to formulate solid particle filled feed materials having properties in both the solid and fluid forms which enable them to be fed into and deposited from the dispensing head, and the need to remove the binders from the formed article and sinter or otherwise densify the solid particles to from a final product having the desired dimensions and properties. The fabrication of solid functional components from these materials raises additional difficulties, including the need to avoid the occurrence of defects in the interior of the formed article.

SUMMARY OF THE INVENTION

The present invention addresses these needs.

One aspect of the present invention provides a process for producing a three-dimensional article using freeform fabrication techniques. A mixture of a particulate composition dispersed in a binder is fed to a dispensing apparatus and dispensed onto a build platform. During the dispensing step, the dispensing apparatus and the build platform are moved relative to one another in a plane defined by first and second directions and in a third direction orthogonal to the plane to form the mixture into a three-dimensional article. To control movement of the dispensing apparatus and the build platform, an image of the three-dimensional article is created on a computer, the image including a plurality of segments defining the article. Programmed signals corresponding to each of the segments are generated in a predetermined sequence, and the dispensing apparatus and the build platform are moved relative to one another in response to the programmed signals.

At least a portion of the binder is removed from the article after it has been formed. In preferred processes, a major portion of the binder is removed from the article by heating the article to a selected temperature according to a predetermined heating cycle. In still more preferred processes, the article is at least partially densified, preferably by heating the article to a temperature greater than the selected temperature to at least partially bond the particulate composition together.

Preferably, the particulate composition is selected from the group consisting of ceramic materials, elemental metals, metal alloys and combinations thereof. Where the binder includes a plurality of organic components having melting temperatures in a range from a lowest melting temperature to a highest melting temperature, the particulate composition may include an organic material having a melting temperature greater than the highest melting temperature. The particulate composition desirably includes between about 0.3 volume percent and about 19 volume percent of a dispersant selected from the group consisting of oleyl alcohol (9-octadecen-1-ol), 3-aminopropyltriethoxysilane, and KRTTS (Titanium IV 2-propanolato tris (isooctadecanoato-o)).

The binder preferably is selected from the group consisting of thermoplastic binders, thermosetting binders, water soluble binders and organic solvent soluble binders. Preferred thermoplastic binders include a plurality of organic components, including between about 5 volume percent and about 50 volume percent of a polymer, between about 5 volume percent and about 50 volume percent of a wax, between about 20 volume percent and about 70 volume percent of an elastomer, and between about 5 volume percent and about 50 volume percent of a tackifier. The binder may also include between about 1 volume percent and about 20 percent of a plasticizer.

Optionally, the mixture is formed into a solid flexible filament prior to the feeding step. The filament may be fed to the dispensing apparatus in a solid state and then heated to place the mixture in a flowable fluid state for dispensing. Preferably, the filament is wound around a spool prior to the feeding step, the filament being sufficiently flexible to uniformly wrap in a smooth curve around the spool and being sufficiently rigid to not be deformed by compressive forces during the feeding step.

The dispensing apparatus and the build platform are moved relative to one another in the direction parallel to the plane to form a first layer of the mixture on the build platform. The dispensing apparatus and the build platform are then moved away from one another in the third direction by a predetermined layer thickness and, after the portion of the first layer adjacent the dispensing apparatus has cured to a solid state, a second layer of the mixture is dispensed in a fluid state onto the first layer while the build platform and the dispensing apparatus again are moved relative to one another in the direction parallel to the plane, whereby the second layer cures to the solid state and adheres to the first layer. Multiple layers of the mixture may be formed on top of one another by repeated dispensing of the mixture in the fluid state from the dispensing apparatus as the build platform and the dispensing apparatus are moved relative to one another. The dispensing apparatus and the build platform are moved away from one another in the third direction by the predetermined layer thickness after each preceding layer has been formed, the dispensing of each successive layer being controlled to take place after the mixture and the preceding layer immediately adjacent the dispensing apparatus has cured to the solid state.

In a preferred variant of the process, the dispensing apparatus and the build platform are moved relative to one another in the direction parallel to the plane according to a first predetermined pattern to form an outer boundary of the mixture on the build platform, the outer boundary defining an interior space. The dispensing apparatus and the build platform are then moved relative to one another in the direction parallel to the plane according to at least one other predetermined pattern to fill the interior space with the mixture.

Desirably, an image of the three-dimensional article is created on the computer, the image including a plurality of segments defining the article. Program signals corresponding to each of the segments are generated in a predetermined sequence for determining the movement of the dispensing apparatus and the build platform relative to one another in the first predetermined pattern and the at least one other predetermined pattern. The at least one other predetermined pattern may include a plurality of raster segments contacting the outer boundary at points of intersection. In highly preferred processes, additional program signals are generated to dispense an additional amount of the mixture at the points of intersection.

Another aspect of the present invention provides a process for producing a three-dimensional article having different compositions in discrete portions thereof. According to this process, a first mixture of one particulate composition dispersed in a binder and a second mixture of another particulate composition dispersed in a binder, the second mixture being different than the first mixture, are fed to at least one dispensing apparatus. As the first and second mixtures are dispensed onto the build platform, the dispensing apparatus and the build platform are moved relative to one another in a plane defined by first and second directions and in a third direction orthogonal to the plane to form the first and second mixtures into a three-dimensional article in which the first and second mixtures are dispensed in preselected regions of the article. The article may then be subjected to binder removal and densification steps.

In one variant of this last process, the dispensing apparatus and the build platform are moved relative to one another in the direction parallel to the plane according to a first predetermined pattern while the first mixture is dispensed to form an outer boundary of the first mixture on the build platform. The dispensing apparatus and the build platform are then moved relative to one another in the direction parallel to the plane according to at least one other predetermined pattern while the second mixture is dispensed to fill the space within the outer boundary with the second mixture.

In another variant of this last process, the dispensing apparatus and the build platform are moved relative to one another in the direction parallel to the plane while the first mixture is dispensed to form a first layer of the first mixture on the build platform. The dispensing apparatus and the build platform are then moved away from one another in the third direction by a predetermined layer thickness, and are then moved relative to one another in the direction parallel to the plane while dispensing the second mixture to form a layer of the second mixture on the first layer.

In yet another variant of this last process, the dispensing apparatus and the build platform are moved relative to one another in the direction parallel to the plane while the first and second mixtures are simultaneously dispensed to form a layer of the first and second mixtures on the build platform, selected portions of the layer consisting essentially of the first mixture and remaining portions of the first layer consisting essentially of the second mixture.

Processes in accordance with the present invention can be used to fabricate an unlimited variety of three-dimensional articles, including but not limited to turbine blades, seals, ceramic cores for use in investment casting, tooling for injection molding, cutting and milling tools, piezoelectric and ferroelectric components, electro-mechanical sensors and actuators, optical materials, artistic works, valves, rocket nozzles, fluidic logic devices, refractories, catalytic converter substrates, etc.

BRIEF DESCRIPTION OF THE DRAWINGS

A more complete appreciation of the subject matter of the present invention and the various advantages thereof can be realized by reference to the following detailed description, in which reference is made to the accompanying drawings in which.

DETAILED DESCRIPTION OF THE PREFERRED EMBODIMENTS

Figure 1:
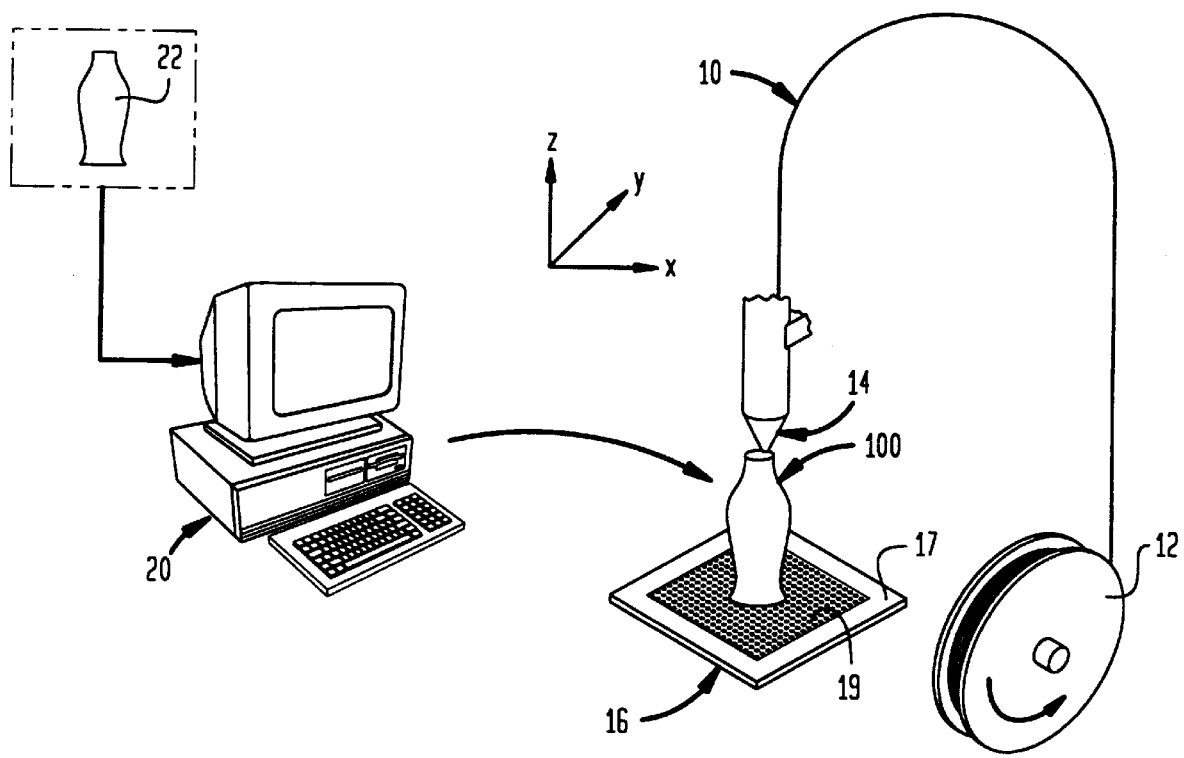
FIG. 1 is a diagrammatic view showing the fused deposition forming step of the overall process in accordance with the present invention.

Preferred processes according to the present invention generally include the steps of (1) preparing a solid particle/binder feedstock composition; (2) forming a three-dimensional object from the feedstock composition by a fused deposition freeform fabrication process; (3) removing at least a portion of the binder from the formed object; and, optionally, (4) partially to fully densifying the object by heat treatment or otherwise. Each of these steps will be discussed in more detail below.

The feedstock compositions utilized in the present invention are generally prepared by mixing one or more solid particulate materials with a binder system consisting of one or more organic materials to form a mixture. As used herein, the term "particulate materials" refers to powders, platelets, granules, whiskers, and discontinuous and continuous fibers. The amount of solid particles in the mixture will depend, at least in part, on the bulk density of the article being produced. In that regard, for certain low density applications, the solid particles desirably constitute at least about 10 volume percent of the mixture. For forming higher density articles including articles that are fully dense, the solid particles desirably constitute at least about 40 volume percent, and more desirably, at least about 50 volume percent of the mixture.

The solid particles preferably are selected from the group comprising ceramic materials, elemental metals, metal alloys, steels and combinations of the foregoing. Ceramic materials may include, for example, oxides, carbides, borides, nitrides and the like, as well as combinations thereof; elemental metals may include, for example, silver, gold, platinum, nickel, aluminum, copper, gold, lead, magnesium, manganese, titanium, iron and combinations of these metals; and metal alloys may include, for example, alloys and combinations of alloys of the foregoing elemental metals. It is also contemplated that the solid particles may consist of or include an organic material component having a melting point which is higher than the melting points of the binder system components such that the particles will remain in solid form during the formulation of the feedstock composition and during the fused deposition forming process. These organic material particles may be used alone or in combination with solid particles of one or more of ceramic materials, elemental metals and metal alloys.

The physical properties of the particulate materials employed in the feedstock compositions largely will be dictated by the particular material being used and the properties sought in the article being produced. In this regard, techniques conventional in the ceramic and metallurgical industries may be utilized to prepare and characterize the particulate materials to be used in the process. Selection of an appropriate particle size distribution is particularly important so that the desired level of solids (low or high) can be loaded into the binder system while maintaining the flowability of the feedstock composition in the fluid state. Also, the size of the largest particles in the distribution should be substantially smaller than the diameter of the dispensing nozzle outlet so as to avoid any bridging effects. A maximum particle size of not more than one-fourth of the nozzle outlet diameter is preferred. There is no minimum particle size, the invention contemplating the use of nanoscale powders alone or in combination with particles in a larger particle size range.

Desirably, the particulate materials are mixed with a dispersing agent which modifies the cohesive forces between the particles and the components of the binder system, thereby enhancing the dispersion of the particles within the binder system and improving the flow of the feedstock composition during molding. Dispersing agents may be selected from the group consisting of dispersants, surfactants, coupling agents specific to the material being dispersed and combinations thereof. Dispersing agents typically are derived from fatty acids, fatty glycerol esters, fatty bisamides, and fatty esters not based upon glycerin, and the selection of a particular dispersing agent therefore will depend upon the particulate material and binder system components in the composition. Preferred dispersing agents for use with the preferred binder system described below may be selected from the group consisting of oleyl alcohol (9-octadecen-1-ol), 3-aminopropyltriethoxysilane, and KRTTS (Titanium IV 2-propanolato tris (isooctadecanoato-o)). Preferably, between about 0.3 volume percent and about 19 volume percent of the dispersing agent (based upon the volume of the particulate materials), and more preferably between about 3 volume percent and about 12 volume percent of the dispersing agent, is added to the particulate material so as to produce an approximate surface coverage on the particles of one monolayer. Prior to its addition to the particulate material, the dispersing agent may be dissolved in an appropriate solvent. The dissolved dispersing agent may be intimately combined with the particles using conventional mixing techniques, such as ball milling, following which the solvent is removed from the mixture. After removal of the solvent, the particles may be screened in a conventional fashion to yield a free flowing particulate composition. The dispersing agent may, of course, be added directly to the mixture of the particulate materials and the binder system components during the mixing step.

The binder system preferably includes one or more organic components combined together to form a mixture which is either thermoplastic, thermosetting, water soluble, or organic solvent soluble, thermoplastic binder systems being particularly preferred. The formulation of the binder system will be influenced by many factors. Included among these factors are that the binder system exhibit good flow properties during the fused deposition forming process; be stable under the mixing and forming conditions; be compatible with the other components of the mixture; impart adequate strength in solid form; leave minimal residue following the binder removal step; impart sufficient flexibility to the feedstock composition so that it can be formed into filaments and spooled and unspooled without breakage, yet have enough stiffness and compressive strength to push the mixture out from the dispensing head during the fused deposition forming process as described further below; and have a low cost and long shelf life.

Although other binder systems and, in particular, other thermoplastic binder systems may be used in practicing the present invention, one series of preferred thermoplastic binder systems which exhibit the rheological and mechanical properties required for the fused deposition of solid particulate materials consists of several components, including a polymer which acts as the backbone of the system to hold the particles together and provide the mixture with a certain strength and stiffness, a wax which acts to lower the overall viscosity of the binder system, an elastomer which increases the flexibility and toughness of the system, and a tackifier which enhances bonding between the successive layers during the fused deposition forming process. Preferred polymers have a relatively low glass transition temperature and a relatively low melting point. Such polymers may be selected from the group consisting of polyvinyl alcohol, polyethylene, polyvinyl acetate, poly (vinyl ethers), poly (vinyl esters), vinyl ester copolymer, ethylene-vinyl acetate copolymer and combinations thereof. Desirably, the polymer is present in the binder system in amounts of between about 5 volume percent and about 50 volume percent based upon the total volume of the binder system. Preferred waxes may be selected from the group consisting of paraffin waxes, microcrystalline waxes, synthetic hydrocarbon waxes, oxidized polyethylene waxes and combinations of the foregoing. The binder system preferably includes between about 5 volume percent and about 50 volume percent of the wax component. Preferred elastomers may be selected from the group consisting of polychloroprene, styrene-butadiene copolymer, natural rubber, neoprene, polyisoprene, polybutadiene and combinations thereof. The elastomer desirably comprises between about 20 volume percent and about 70 volume percent of the binder system. Preferred tackifiers may be selected from the group consisting of terpene and polyterpene resins, terpene phenolic resins, aliphatic petroleum hydrocarbon resins, rosins, rosin derivatives, such as the ethylene glycol ester of rosin acids, and combinations thereof. Desirably, the tackifier is present in the binder system in amounts of between about 5 volume percent and about 50 volume percent. A particularly preferred binder system includes about 18.75 volume percent of a polymer, about 20.25 volume percent of a wax, about 28.0 volume percent of an elastomer, and about 33.0 volume percent of a tackifier.

In addition to the foregoing components, the binder system may include a plasticizer for increasing its overall flexibility. Selection of an appropriate plasticizer will depend upon several factors, including its compatibility with the particulate material and binder components in the mixture, its effectiveness in increasing the flexibility of the mixture in the solidified state, and its effect on the binder removal step. Preferred plasticizers may be selected from the group consisting of dibutyl phthalate, dihexyl phthalate, triphenyl phosphate, (dipropylene glycol) butyl ether, diethyleneglycolmonoricinoleate and combinations of the foregoing, dibutyl phthalate being particularly preferred. Desirably, the plasticizer is added in amounts of between about 1 volume percent and about 20 volume percent based on the total volume of the binder system.

Once the solid particulate materials and binder system components have been selected, these materials are mixed together to form a mixture. The importance of the mixing step cannot be underestimated, since deficiencies in the quality of the mixture most often cannot be corrected by subsequent processing adjustments. For example, the failure to deagglomerate and evenly distribute the particulate materials within the binder system may result in nonuniform shrinkage and the introduction of strength-limiting flaws in the article being produced. Preferably, the particulate materials and the binder system components in the molten or fluid state are mixed together using high shear mixing techniques to form a substantially homogeneous mixture having the desired loading of the particulate materials in the binder system, although mixtures which are less homogeneous or nonhomogeneous are also contemplated.

The mixture may be molded into rods or other blanks for use in the fused deposition forming step, or may be used directly in the fused deposition forming step without prior solidification. Alternatively, the mixture may be solidified and granulated, and used in the fused deposition forming step in the granulated form. In a preferred embodiment of the present invention, the granulated feedstock composition may be sieved to divide out particles in a preselected particle size range, and then processed through conventional apparatus, such as a capillary rheometer, piston extruder, single or twin screw extruder or the like, to form continuous flexible filaments having a diameter of between about 0.010 inches and about 0.50 inches. It is important to the fused deposition process that the diameter of the filaments be uniform along their length, with diameter variations of ±0.001 inches or less being particularly preferred. Desirably, these filaments may be wound in continuous lengths on a spool for use as the feedstock in the fused deposition forming process. Preferred filaments will have sufficient flexibility that they may be wound in a smooth curve on a spool without breaking, and sufficient compressive strength that they do not buckle or otherwise overtly deform by compressive forces as they are fed into the dispensing head during the fused deposition forming process.

A fused deposition forming process which may be used in the forming step of the present invention is that described in detail in U.S. Pat. No. 5,121,329. A diagrammatic illustration of the process is shown in FIG. 1. According to the process, a flexible filament 10 is fed from a supply spool 12 into and through the dispensing head 14 of a fused deposition apparatus 15. Dispensing head 14 is positioned in close proximity to the build platform 16 on which are article 100 is to be built. Dispensing head 14 and build platform 16 are supported in a conventional manner for movement relative to one another along the "X", "Y" and "Z" axes as shown. Thus, dispensing head 14 may be mounted in a known fashion for movement in a plane defined by the X and Y axes, with build platform 16 supported for separate movement toward and away from dispensing head 14 along the Z axis. Alternatively, build platform 16 may be supported for movement in the plane defined by the X and Y axes, with dispensing head 14 mounted for separate movement along the Z axis toward and away from build platform 16. It will be appreciated that movement in the X-Y plane need not be limited to movement in orthogonal directions, but may include movement in radial, tangential, arcuate and other directions in the X-Y plane. The separate movement of dispensing head 14 and build platform 16 in the X, Y and Z directions may be effected by any of the mechanical drive systems well known in the art. These drive systems preferably are driven by high resolution reversible stepper motors, although other types of drive motors may be used, including linear motors, servomotors, synchronous motors, D.C. motors and fluid motors.

The drive systems preferably are controlled by drive signals generated from a computer 20 running a commercially available CAD program. Utilizing such program, the design of a three-dimensional article 22 may be inputted to computer 20. The article design then may be sectioned into multiple layers by a commercially available software program to provide data corresponding to the particular shape of each individual layer. Such software programs are in commercial use for computer-aided machining (CAM) purposes and include NC Polaris, Smartcam and Mastercam. The layering data signals may be directed to a machine controller (not shown) which selectively actuates the motors for driving dispensing head 14 and build platform 16 in the X, Y and Z directions, respectively, depending upon the layering data signals received.

Dispensing head 14 has a supply chamber 30 with an inlet aperture 32 at its upper end and a lower guide aperture 34 through which flexible filament 10 is fed towards discharge nozzle 36. Discharge nozzle 36 includes a central material supply and flow passage 38 in flow communication at its lower end with a dispensing outlet 40 having an orifice of predetermined size to assist in providing a metered supply of the feedstock material in a fluid state.

An electric resistance heater 42 in the form of a sleeve or another suitable heater may be positioned around discharge nozzle 36. Heater 42, under the control of a suitable temperature controller (not shown), heats the portion of flexible filament 10 within passage 38 of nozzle 36 to a predetermined temperature only very slightly above its melting point so that the feedstock material will solidify very rapidly upon cooling after discharge onto build platform 16. It will be appreciated that the solid particulate materials in filament 10 do not melt at the melting point. Thus, as used herein, the term "melting point" of filament 10 refers to the temperature at which the binder system components in filament 10 are substantially melted so as to place the overall composition of the filament in a fluid state in which it flows outwardly from dispensing outlet 40 onto the surface of build platform 16. Of course, dispensing head 14 need not include heater 42 where filament 10 incorporates a thermosetting, water soluble, or organic solvent soluble binder system.

Flexible filament 10 may be fed into and through dispensing head 14 by a plurality of drive rollers 44 connected to one another by a suitable belt or chain drive 46 and driven simultaneously by a motor 48, such as a stepper motor, and a drive belt or chain 50. A plurality of idler rollers 52 spaced opposite to drive rollers 44 may cooperate therewith to grip flexible filament 10 therebetween and to advance it through dispensing head 14 towards the dispensing outlet 40 of nozzle 36. By selective control of drive motor 48, the rate of advance of flexible filament 10, and thus the volumetric dispensing rate of the fluid feedstock onto build platform 16, can be very closely controlled.

The size of dispensing outlet 40 may be varied depending upon the particular application, as by using interchangeable nozzles having different orifice sizes, or interchangeable orifice inserts in the tip of nozzle 36. Also, a variable size orifice of the type employed in cameras for varying the aperture could be utilized. The volumetric rate at which the material is dispensed from dispensing head 14 onto build platform 16 thus will be determined by a combination of the preselected orifice size of dispensing outlet 40, as well as by controlling the rate of advance of flexible filament 10 through controlled rotation of drive rollers 44.

As filament 10 is heated in dispensing head 14 to a fluid state, the solid particle filled fluid material is metered at a controlled flow rate onto the receiving surface 17 of build platform 16. Receiving surface 17 preferably includes a substrate 19 on which article 100 is actually built, which substrate minimizes localized shrinkage in the foundation layer of article 100 and permits the formed article to be released from build platform 16 without damage. One preferred substrate material is a relatively fine, wire mesh sandpaper such as Norton No. 47650-4. Forming the wire mesh from an electrically conductive material, such as copper wire, permits a low voltage current to be applied to heat substrate 19 slightly to facilitate the separation of article 100 therefrom. Alternatively, substrate 19 could be made from a water soluble wax which could be dissolved and easily separated from article 100 without damage; from a low density foam which easily can be cut or dissolved away from the article, such as a foam available from Stratasys, Inc. under the name Foundation Foam; or from other such substances.

As indicated in FIG. 1, the drive signals generated from computer 20 selectively move dispensing head 14 and build platform 16 with respect to one another in a predetermined pattern as the feedstock material is being dispensed so as to build up multiple layers of the material and form an article of desired shape. Multiple passes of dispensing head 14 are made, with each pass taking place in a controlled pattern dictated by the layering software. The computer and related software programs determine the on and off conditions of the various motors controlling the movement of dispensing head 14 in the X-Y plane, the movement of build platform 16 in the Z direction, and the rotation of driver rollers 44 for advancing filament 10. Each of these motors may be operated separately, or one or more of them may be operated simultaneously depending on the shape of the article to be formed. Dispensing head 14 is initially positioned at a predetermined height above build platform 16 or substrate 19 to form the first layer. The height of each subsequent layer is then closely controlled in order to dispense and form very thin layers. The thinner the layers, the smoother the resulting surface of the formed article. Layers as thin as 0.001 inches may be formed. The layers can be formed in a horizontal plane, a vertical plane, or in a plane oriented at any angle with respect to the horizontal plane. Normally, dispensing head 14 will be mounted along the Z axis generally perpendicular to the receiving surface 17 of build platform 16 which extends in the X-Y plane. Deposition of the material may take place along any of the three axes.

When forming and building up multiple layers, the initial relative movement of build platform 16 and dispensing head 14 preferably will be in a horizontal plane defined by the X and Y axes. In a typical scenario, feedstock material may be dispensed to form a closed loop defining the outer perimeter of each layer as dispensing head 14 and build platform 16 are moved relative to one another. The area within the closed loop then may be filled by moving dispensing head 14 back and forth relative to build platform 16 in a predetermined pattern consisting of one or more continuous raster segments. The first layer, which may take any shape dictated by the computer program, solidifies as it cools below the melting points of the binder components and adheres to substrate 19. Upon completion of the raster fill in a layer, dispensing head 14 may move away from the layer by a predetermined layer thickness and the process may be repeated, the perimeter of the next layer being deposited first and then the area within the perimeter being filled by one or more continuous raster segments. Preferably, no material is dispensed onto a previously formed layer until that portion of the layer under dispensing head 14 has solidified. The second and each subsequent layer may take slightly different shapes as dictated by the particular cross-section for each layer from the computer program and layering software.

Layer by layer are built up in this way until the entire three-dimensional article has been formed.

It will be appreciated that where the feedstock material incorporates a thermosetting, water soluble, or organic solvent soluble binder system, the solidification of the feedstock material from the fluid state may not involve a cooling step. Rather, solidification may occur through other mechanisms, including gellation, evaporation, curing, heating and chemical reaction.

In some instances, dispensing head 14 may move along the Z axis away from build platform 16 as a layer is being formed, such as when forming a spiral pattern. In such event, the software program will control the location of dispensing head 14 at the end of each layer. Thus, when at the start position for the next layer, dispensing head 14 may have already been raised a distance along the Z axis above the corresponding point on the previously formed layer. In such circumstance, dispensing head 14 may not have to be raised at all for deposition of the next layer, or it may have to be raised only an incremental portion of the predetermined layer thickness.

Figure 2:
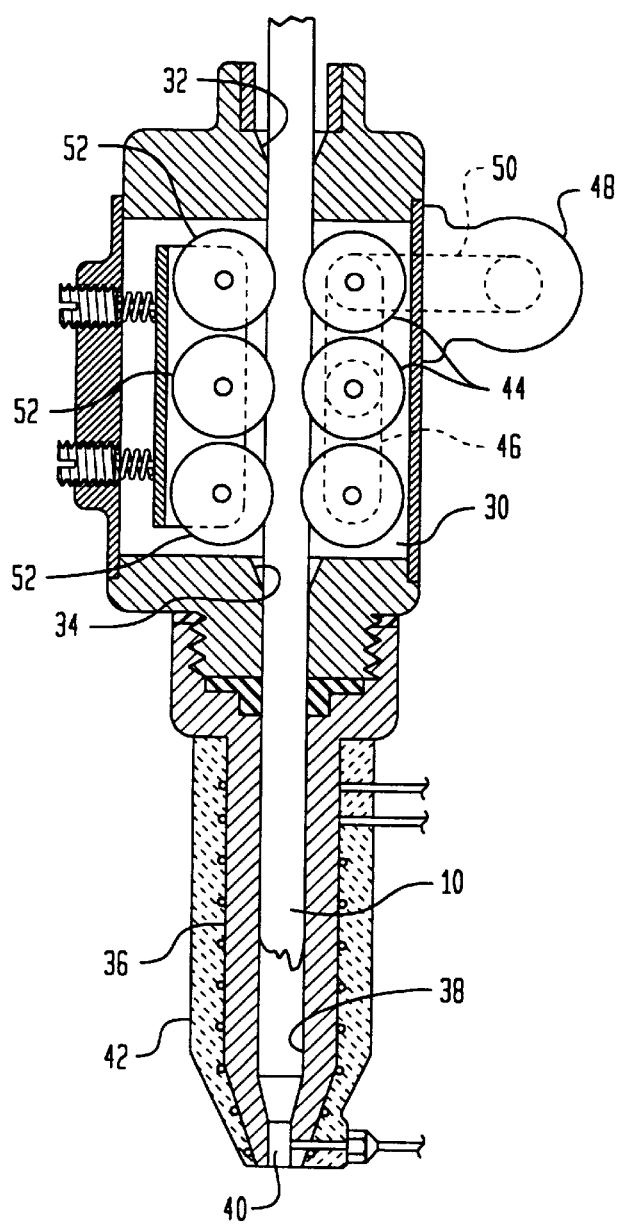
FIG. 2 is a schematic cross-sectional view of an embodiment of the dispensing head used in the fused deposition forming step.

Each layer of material is dispensed in a fluid state, solidifies and adheres to the previous layer. This forms a strong bond between layers. When utilizing a dispensing head with a discharge nozzle 36 having a flat bottom surface as shown in FIG. 2, the flat bottom surface of the nozzle produces a "doctor blade" effect as dispensing head 14 and build platform 16 are moved relative to one another in the horizontal X-Y plane. By surface contact with the layer of material as it is being dispensed, the tip of dispensing nozzle 36 defines the top of each layer, and thus assists in maintaining each layer at the predetermined layer thickness. Alternatively, a separate squeegee, roller or doctor blade can be used to define the top of each layer, and thus the layer thickness. The multiple layers may be of uniform thickness or may vary in thickness as necessary and appropriate for forming a particular article. Also, the layers may each vary in thickness across the height of each layer.

Preferably, the melting point of the feedstock material is such that the deposited layer will solidify rapidly at the build environment temperature at the thicknesses in which it is dispensed. Where the feedstock material does not solidify rapidly upon being dispensed because of the relatively low melting temperature of the feedstock material or because of the relative thickness of the dispensed layer, then the dispensed layer may be cooled by conventional techniques either directly or through build platform 16. Regardless of the technique used, any cooling operation must be carefully controlled to prevent defects such as shrinkage distortion, poor layer-to-layer bonding, cracking, etc.

Figure 4:
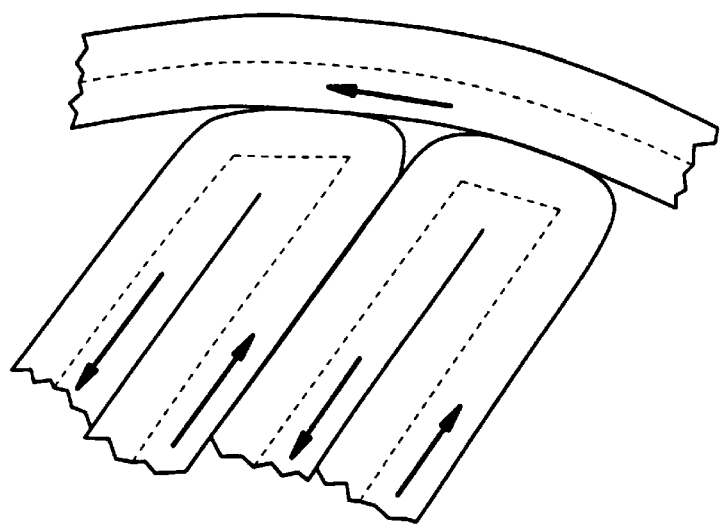
FIG. 4 is a highly schematic view showing subperimeter voids resulting from incomplete fill at the intersection of an interior fill pattern with the perimeter of a layer.
Figure 5:
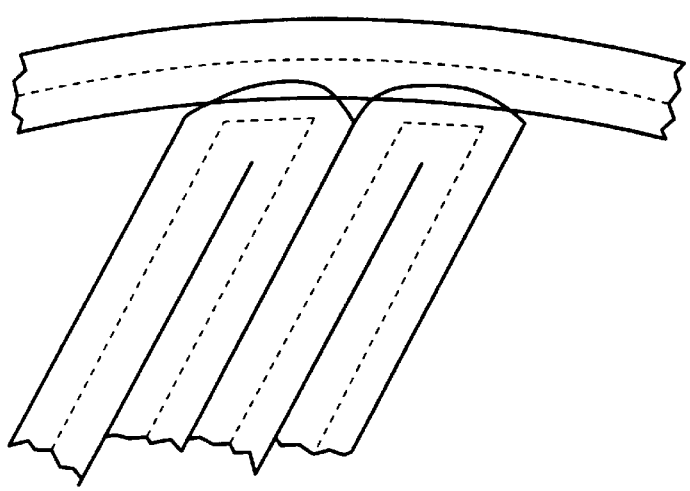
FIG. 5 is a highly schematic view showing a method for minimizing subperimeter voids using a negative offset.

Particular care must be exercised in depositing the layers so as to eliminate internal defects in the formed article. Internal defects such as voids, cracking and delaminations may arise from several different sources. Subperimeter voids typically are caused by the incomplete filling of the area inside the perimeter of the layers. As noted, each layer is built by laying down a predetermined width of road defining the outer boundary of each layer and then filling up the internal portion of the defined boundaries by raster scan. At the point where the path of dispensing head 14 approaches the perimeter of the layer during raster fill, the travel direction of the dispensing head changes to a path that is tangent to the perimeter. This technique may lead to the formation of a void as insufficient material flows to fill the volume at these intersections. An example of a subperimeter void resulting from this dispensing technique is shown schematically in FIG. 4. One way of overcoming this problem is to increase the dispensing rate at these points of intersection, either by increasing the feed rate of the filament to the dispensing head or by slowing down the movement of the dispensing head relative to the build platform. Another method of overcoming this problem is to alter the layering data signals so as to include a negative offset in the perimeter information. That is, the layering data signals may be altered to fill a larger area than actually exists within the perimeter of the layer. Thus, for example, assuming a layer is to be formed in the shape of a circle having an outer diameter of 2.0 inches, and the perimeter of the layer is deposited in a road width of 0.01 inches, then the area to be filled by raster scan across the diameter of the layer will be 1.98 inches (2.0–0.02). To assure complete filling at the intersection of the perimeter of the layer with the raster scan across the diameter of the layer, the layering data signals across the diameter may be altered to deposit a road which is 1.99 inches in length, thus producing a 0.005 inch overlap at each of the two points of intersection. An example of this technique is shown in FIG. 5.

Figure 6:
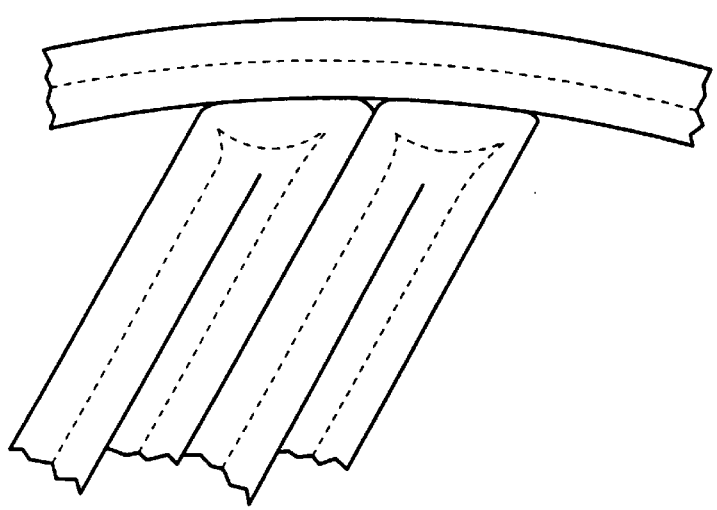
FIG. 6 is a highly schematic view showing a method for minimizing subperimeter voids by introducing additional data signals to create dog ears in the raster path.

Still another way of overcoming the formation of subperimeter voids is to insert additional layering data signals at each point where a raster scan intersects with the perimeter road of a layer. An example of this technique is shown in FIG. 6. In accordance with this technique, these additional data signals cause the dispensing head to jog in back and forth directions substantially parallel to the direction of the perimeter road so as to create "dog ears" in the deposited road at these points of intersection.

Internal voids may also result from the use of an incorrect road width for filling the internal area of each layer such that an unfilled region narrower than the road width remains after the raster scans for the layer have been completed. These defects can be eliminated by carefully determining the precise road width needed to fill each layer completely.

Figure 3:
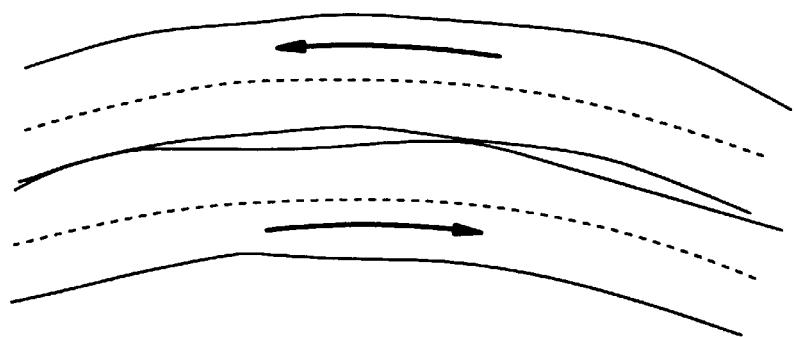
FIG. 3 is a highly schematic view showing internal voids resulting from variations in road thickness.

Still other voids may result from variations in the road width and thickness. That is, where there is a localized decrease or increase in the width or thickness of a road, two adjacent roads may not contact one another along their entire lengths, leaving a void space between them. An example of an interroad void is shown schematically in FIG. 3. Variations in the road width or thickness may be caused by inconsistent material flow which, in turn, may be due to slippage in the filament feed mechanism or to variations in the cross-sectional dimensions of the filament. Voids resulting from variations in the road width or thickness therefore may be minimized or eliminated by careful control of the cross-sectional dimensions of the filament and the feeding mechanism. In addition, these voids may be minimized by localized heating or cooling of the substrate to control shrinkage, the formation of localized sinks, and other defects which may arise as the feedstock material solidifies. These defects can also be addressed by altering the layering data signals to include a negative gap in the position of the road being deposited so that the roads move closer together in partially overlapping relationship.

Internal delaminations may arise when adjacent roads do not bond to one another. This is particularly problematic when depositing roads along long vector lengths, wherein the time delay between the deposition of two adjacent roads is high. This time delay results in a large temperature decay in the previously deposited road, such that there is poor adhesion between the adjacent roads. This poor adhesion in the "green" or undensified article may lead to delaminations during the binder removal and/or densification steps. The occurrence of this defect may be reduced by improving inter-road adhesion through the optimization of the tackifier component in the binder system, through localized substrate heating to retard the temperature decay in the deposited road, or through a redefined raster scan pattern.

Still other defects may occur when the contour of the layer to be filled does not permit a continuous fill pattern to be used. As a result of segmenting the fill pattern, an error may be caused along the "knit" or joining line between one segment and another. These knit lines frequently lead to cracking problems during binder removal and densification. This problem can be minimized by carefully designing the fill pattern to eliminate the need for multiple fill segments in a single layer. The problem may also be reduced by locally heating the substrate or increasing the fill rate so as to ensure good adhesion between the segments at the knit line.

It will be appreciated that innumerable modifications may be made to the fused deposition forming process. For example, as noted above, rather than in the form of continuous filament 10, the feedstock material may be supplied to the dispensing head 14 of fused deposition apparatus 15 in a fluid state, such as where a feedstock composition incorporating a thermoplastic binder system is supplied to the dispensing head at a temperature above its melting temperature; in the form of a granulated solid; or in the form of a solid rod, bar of filament of finite length. Regardless of the form in which the feedstock material is supplied to dispensing head 14, the supply mechanism must be capable of careful control so that the volumetric dispensing rate of the feedstock material can be controlled accurately.

In addition to dispensing head 14, the fused deposition process can be carried out using other types of apparatus known in the art, provided that dispensing through that apparatus can be controlled accurately. Such apparatus may include, for example, conventional piston or plunger types of dispensing mechanisms, or highly controllable screw-type feeders such as that disclosed in U.S. Pat. No. 5,312,224.

Also, the fused deposition process may be arranged so that multiple and different feedstock materials can be dispensed either alternately through a single dispensing nozzle, or alternately or simultaneously through multiple dispensing nozzles. Methods for dispensing multiple and different feedstock compositions are disclosed in U.S. Pat. No. 5,121,329 referred to and incorporated by reference hereinabove. These methods may be designed, for example, to dispense a composition including a metal from one nozzle to form the outer surface of the article and a composition including a ceramic from another nozzle to fill the inner portion of the article (or vice versa); to dispense a material (metal, ceramic, polymer or mixture thereof) from one nozzle and a different material (metal, ceramic, polymer or mixture thereof) from another nozzle in alternating layers to form a multiphase article; or to dispense two or more different materials (metal, ceramic, polymer or mixture thereof) in different or alternating regions within one or more single layers.

Following its formation by the fused deposition process, article 100 may be processed to improve its surface finish. Such processing may include machining of the surface by sanding, grinding, vibrating in an abrasive media, and other techniques known in the art. This machining step may take place while the article is in the "green" state prior to binder removal, with the article in the "bisque" state prior to densification, after densification, or at a combination of these stages. Also, a machining step may be performed on a layer by layer basis during the fused deposition forming process. Furthermore, article 100 optionally may be subjected to a post fabrication treatment such as cold isostatic pressing or warm isostatic pressing to facilitate the removal of any residual internal voids, delaminations or other defects.

Subsequent to any green machining operation, article 100 may be processed to remove at least a portion of the binders therefrom. Binder removal may be accomplished by various techniques, including solvent extraction, supercritical fluid processes, thermal processes and combinations thereof. One preferred binder removal technique is a thermal processing step in which the article is gradually heated according to a predetermined time-temperature schedule. The parameters of this thermal processing or "binder burnout" cycle will, of course, depend upon the particular formulation of the binder system. Other factors influencing the binder burnout cycle include the relative proportion of the binder in the article, the proportion of the binder to be removed, the cross-sectional size and shape of the article, and the physical and thermal properties of the solid particles therein. The development of appropriate burnout cycles are conventional, for example, to those skilled in the art of injection molding of ceramics or metals.

In a typical binder burnout cycle, the article is slowly heated to cause the components of the binder system having the lowest melting point to initially soften and flow out of the article through capillary action. This creates channels within the article which facilitate the removal of the binder from the interior of the article, as well as the removal of the binder components having higher melting points. The removal of the binder from the article through capillary liquid transport may be enhanced by completely or partially embedding the article in a setter filled with an inert, thermally stable setter powder such as alumina or carbon. After removal of the binder through capillary liquid transport has proceeded to a certain extent, the temperature may be gradually increased, whereupon the components of the binder may begin to thermally decompose and be removed from the article by diffusion and evaporation. The binder burnout cycle may be conducted in an inert atmosphere, in an oxidizing atmosphere or in a reducing atmosphere depending on the binders being removed, the amount being removed, the composition of the particulate materials in the article, etc.

Binder burnout may take place in a continuous cycle, or may include one or more cooling phases defining individual stages of the cycle. The development of the appropriate binder burnout cycle is critical since too rapid a rate of binder removal frequently results in the generation of defects within the article. Such defects include, for example, bloating, blistering, surface or internal cracking and delaminations.

Following the binder removal step, the article optionally may be subjected to a densification step. Densification may be accomplished in many ways, including thermal treatment, hot pressing, hot isostatic pressing, reaction bonding, directed metal oxidation, reaction infiltration, chemical vapor deposition and combinations thereof. In a preferred densification procedure, the article may be sintered according to a preselected time-temperature schedule to bond the particles therein together and to develop the final properties of the article. Again, the time-temperature profile of the sintering step will depend upon the compositions of the solid particles in the article and the properties desired to be obtained. Generally, more refractory or thermally stable particulate materials must be sintered at higher temperatures and/or for longer times to develop higher strength and density.

Rather than sintering to densify the article after the binder removal step, the article may be "bisque" fired to a relatively low temperature to bond the particles together sufficiently for the article to be handled without breaking. The bisque fired article may then be used as is, or may be further processed as desired, for example, by infiltrating its pores with a metal, polymer, glass, ceramic solution or the like.

The following examples illustrate certain features of the invention as described above.

EXAMPLE I

An in-situ reinforced $\alpha$-$Si_3N_4$ powder commercially available under the designation GS-44 from Allied Signal Ceramic Components of Torrance, California is used as the particulate component. The binder system is commercially available from Stratasys, Inc. Of Eden Prairie, Minn. under the designation ICW04 wax and includes 35 volume % of a polymer, 30 volume % of a wax, 21 volume % of an elastomer and 14 volume % of a tackifier. A mixture is made from these components in a torque rheometer mixer heated to a temperature of 100° C. by melting 80 gm of the binder in the mixer and, with the blades rotating, gradually adding 384 gm of the GS-44 powder to achieve a substantially homogeneous mixture consisting of 60 volume percent GS-44 and 40 volume percent binder. This procedure is repeated to yield a total of 928 gm of the mixture. The mixture is then cooled, granulated using a grinder, and sieved to segregate the granulated material having a particle size between 1 mm and 4 mm.

The segregated fraction of the granulated mixture is then extruded using a twin screw extruder having an outlet diameter of 0.07 inches. With the screws of the extruder rotating at speeds of 5–15 rpm, filaments having a diameter of between 0.066–0.070 inches are formed. Since these filaments are not flexible enough to be spooled without breaking, they are cut to lengths of 10–20 inches.

The filaments are used to fabricate articles of various shapes using a fused deposition process. The filaments are fed into the dispensing head of a fused deposition apparatus heated to a temperature of 145–155° C. and dispensed in road widths of 0.01–0.05 inches onto a foam substrate on the surface of a build platform in a room temperature environment of 35–40° C. The articles are built in layer thicknesses of 0.01–0.03 inches, with the dispensing head moving at a speed of 0.5 inches per second relative to the build platform. The material is dispensed from the dispensing head at a flow rate of 0.05 cc/min–0.75 cc/min depending upon the road width and layer thickness used.

Once the articles are completely built, they are cut away from the foam substrate and "green machined" using a 320 grit grinding paper to produce a visually acceptable surface finish. The articles are then placed in an alumina crucible or boat and completely embedded in an activated charcoal setter material, and the entire assembly is placed in a mullite tube furnace and heated through a two-stage binder removal cycle. The first stage of the cycle, conducted in a flowing nitrogen environment, consists of the following schedule: a heating rate of 30° C. per hour from room temperature to 80° C.; a heating rate of 5° C. per hour from 80° C. to 100° C.; a heating rate of 3° C. per hour from 100° C. to 150° C.; a two hour "soak" or hold at 150° C.; a heating rate of 2° C. per hour from 150° C. to 350° C.; a 5 hour soak at 350° C.; a heating rate of 5° C. per hour from 350° C. to 400° C.; and a heating rate of 10° C. per hour from 400° C. to 450° C. The articles are then cooled from 450° C. to room temperature at a cooling rate of 10° C. per minute. For articles heated through this first stage of the binder removal cycle, 95–97 wt. % of the total binder is removed from the articles.

In the second stage of the binder removal cycle, the articles are placed in an alumina boat without any setter material and heated in a mullite tube furnace in a static air environment. The second stage of the cycle consists of the following schedule: a heating rate of 30° C. per hour from room temperature to 300° C.; a one hour soak at 300° C.; a heating rate of 10° C. per hour from 300° C. to 450° C.; and a 5 hour soak at 450° C. The articles are then cooled from 450° C. to room temperature at a cooling rate of 10° C. per minute. This second stage of the cycle removes the remainder of the binder, which consists mostly of residual carbon, from the articles.

Following binder removal, the articles are placed inside a graphite crucible and sintered in a nitrogen environment to a temperature of 1800° C. to 2050° C. at a heating and cooling rate of 3–5° C. per minute.

The ceramic parts formed according to this example evidence a 100% conversion to $\beta$-silicon nitride having amorphous grain boundary phases. Shrinkage from green dimensions to sintered dimensions was measured to be 13–17% in the X and Y directions and 16–20% in the Z direction, and a density of greater than 95% of theoretical density was achieved. A four point bend test at room temperature yielded an average fracture strength of 850 MPa.

The parts according to this example exhibited similar internal microstructures in directions parallel and perpendicular to the build direction, and individual layers were indistinguishable. Further, the parts exhibited no delamination and less than 5 volume percent internal void defects based on the total volume of the part.

EXAMPLE II

The GS-44 $Si_3N_4$ powder of Example 1 is mixed with 3 wt % oleyl alcohol as a dispersant by ball milling using denatured ethanol as a solvent. After milling, the suspension is sieved through a 225 um mesh or screen, the ethanol is evaporated, and the powder is dried for twelve hours at 100° C. under vacuum. Using the technique described in Example I, the prepared powders are mixed with a binder system including 18.75 volume % of a polymer, 20.25 volume % of a wax, 28.0 volume % of an elastomer and 33.0 volume % of a tackifier to form a substantially homogeneous mixture including 55.4 volume % of the powder, 6.5 volume % of the dispersant and 38.1 volume % of the binder. The mixture is subsequently cooled, granulated and sieved to segregate out the fraction of the granulated material having a particle size between 1 mm and 4 mm.

The segregated fraction of the granulated mixture is then extruded using a single screw extruder having an outlet diameter of 0.07 inches. With the screw of the extruder rotating at speeds of 5–15 rpm, filaments having a diameter of between 0.068–0.071 inches and a length of 10–50 feet are formed. The filaments have sufficient flexibility that once they have cooled to about room temperature, they may be wound onto a 11.75 inch diameter spool without breaking.

To form articles using the fused deposition process, the filaments are fed into the dispensing head of a fused deposition apparatus heated to a temperature of 150–155° C. and dispensed in road widths of 0.01–0.05 inches with a negative offset of 0.002 inches between roads. The roads are dispensed onto a foam substrate on the surface of the build platform in a room temperature environment of 35–40° C. The articles are built in layer thickness of 0.01–0.03 inches, with the dispensing head moving at a speed of 0.5 inches per second, and the material dispensed at the same rate as in Example I.

Following removal from the foam substrate, the surfaces of the articles are machined in the green state using a 320 grit grinding paper. After being placed in an alumina crucible or boat and completely embedded in an activated charcoal setter material, the articles are placed in a mullite tube furnace and subjected to a two-stage binder removal cycle. The first stage of the cycle, conducted in a flowing nitrogen environment, consists of the following schedule: a heating rate of 30° C. per hour from room temperature to 100° C.; a heating rate of 3° C. per hour from 100° C. to 150° C.; a one hour soak at 150° C.; a heating rate of 2° C. per hour from 150° C. to 300° C.; a two hour soak at 300° C.; a heating rate 5° C. per hour from 300° C. to 350° C.; and a two hour hold at 350° C. The articles are then cooled from 350° C. to room temperature at a cooling rate of 10° C. per minute. Articles heated through this first stage of the binder removal cycle exhibited removal of 75–80 wt % of the total initial binder.

The second stage of the binder removal cycle is conducted in the same manner and according to the same schedule as the second stage of the binder removal cycle described in Example I. Following binder removal, the articles are sintered as described in Example I. The ceramic parts formed according to this example evidence about the same crystal structure conversion, shrinkage, density and fracture strength as in Example I, and about the same volume percent of defects.

EXAMPLE III

A mixture is formed using the technique described in Example I, with the exception that fused silica powders are used in place of the $Si_3N_4$ powders. The mixture consists of 65 volume % silica powders and 35 volume % binder. Following granulation, the mixture is extruded using a capillary rheometer having an outlet diameter of 0.07 inches. Filaments having a diameter of between 0.068–0.070 inches are formed in lengths of 8–12 inches. The filaments are not flexible enough to be wound onto a spool without breaking.

To fabricate the filaments into articles using the fused deposition process, the filaments are fed into a dispensing head heated to a temperature of 110–120° C. and dispensed onto a foam substrate on the surface of a build platform in a room temperature environment of 35–40° C. Road widths of 0.02 inches are dispensed, with a negative gap of 0.001 inches between roads. The articles are built in layer thicknesses of 0.01 inches, with the dispensing head moving at a speed of 0.05 inches per second, and the material being dispensed at a flow rate of 0.098 cc/min.

Following the formation of the articles by the fused deposition process, the binder is removed from the articles employing the two-stage binder removal cycle described in Example I, and sintered only enough to achieve 68–70% of true density which is desired for investment casting core or mold applications.

EXAMPLE IV

Three-dimensional metal articles are formed from a mixture of ICW04 wax and powders of a precipitation-hardened grade of stainless steel commercially available under the designation 17-4PH. The mixing technique of Example I is used to form a homogeneous mixture consisting of 60 volume % of the metal powder and 40 volume % of the binder. After cooling, the mixture is granulated and fabricated into filaments by extrusion using a capillary rheometer with a 0.07 inch die. Filaments having a diameter of 0.068–0.070 inches and lengths of 8–12 inches are formed. The filaments have insufficient flexibility to be wound onto a spool without breaking.

Using a fused deposition process, the filaments are fabricated into three-dimensional articles. According to the process, the filaments are dispensed from a dispensing head heated to a temperature of 100–110° C. onto a foam substrate on the build platform in a room temperature environment of 35–40° C. The articles are built with the dispensing head moving at a speed 0.05 inches per second using roads widths of 0.02 inches with a negative offset of 0.001 inches between roads, a layer thickness of 0.01 inches, and a flow rate of 0.098 cc/min. Following article fabrication, the binder is removed using the two-stage binder removal cycle described in Example I. The article is then sintered using conventional techniques for sintering metal powders.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. In a process for making a three-dimensional article incorporating the steps of: providing a mixture of a particulate composition dispersed in a binder; dispensing the mixture from dispensing apparatus onto a build platform; and during the dispensing step, moving the dispensing apparatus and build platform relative to one another to form the dispensed mixture into a three-dimensional article, the improvement comprising:

Providing as the binder in said mixture a binder including a plurality of organic components having melting temperatures in a range from a lowest melting temperature to a highest melting temperature, and said particulate composition including an organic material having a melting temperature greater than said highest melting temperature.

2. In a process for making a three-dimensional article incorporating the steps of: providing a mixture of a particulate composition dispersed in a binder; dispensing the mixture from dispensing apparatus onto a build platform; and during the dispensing step, moving the dispensing apparatus and build platform relative to one another to form the dispensed mixture into a three-dimensional article, the improvement comprising:

Providing as the binder in said mixture a binder comprising a plurality of organic components including a polymer, a wax, an elastomer, and a tackifier.

3. In a process for making a three-dimensional article incorporating the steps of: providing a mixture of a particulate composition dispersed in a binder; dispensing the mixture from dispensing apparatus onto a build platform; and during the dispensing step, moving the dispensing apparatus and build platform relative to one another to form the dispensed mixture into a three-dimensional article, the improvement comprising:

Providing in said mixture a binder which includes between about 5 volume percent and about 50 volume percent of a polymer selected from the group consisting of polyvinyl alcohol, polyethylene, polyvinyl acetate, poly (vinyl ethers), poly (vinyl esters), vinyl ester copolymers, ethylene-vinyl acetate copolymers and combinations thereof; between about 5 volume percent and about 50 volume percent of a wax selected from the group consisting of paraffin waxes, microcrystalline waxes, synthetic hydrocarbon waxes, oxidized polyethylene waxes and combinations thereof; between about 20 volume percent and about 70 volume percent of an elastomer selected from the group consisting of polychloroprene, styrene-butadiene copolymer, natural rubber, neoprene, plyisoprene, polybutadiene and combinations thereof; between about 5 volume percent and about 50 volume percent of a tackifier selected from the group consisting of terpene and polyterpene resins, terpene phenolic resins, aliphatic petroleum hydrocarbon resins, rosins, rosin derivatives and combinations thereof; and between about 1 volume percent and about 20 volume percent of a plasticizer selected from the group consisting of dibutyl phthalate, dihexylphthalate, triphenyl phosphate, (dipropylene glycol) butyl ether, diethyleneglycolmonoricinoleate and combinations thereof.

4. A process as claimed in claim 2, wherein said binder includes between about 5 volume percent and about 50 volume percent of said polymer.

5. A process as claimed in claim 2, wherein said polymer is selected from the group consisting of polyvinyl alcohol, polyethylene, polyvinyl acetate, poly (vinyl ethers), poly (vinyl esters), vinyl ester copolymers, ethylene-vinyl acetate copolymers and combinations thereof.

6. A process as claimed in claim 2, wherein said binder includes between about 5 volume percent and about 50 volume percent of said wax.

7. A process as claimed in claim 2, wherein said wax is selected from the group consisting of paraffin waxes, microcrystalline waxes, synthetic hydrocarbon waxes, oxidized polyethylene waxes and combinations thereof.

8. A process as claimed in claim 2, wherein said binder includes between about 20 volume percent and about 70 volume percent of said elastomer.

9. A process as claimed in claim 2, wherein said elastomer is selected from the group consisting of polychloroprene, styrene-butadiene copolymer, natural rubber, neoprene, polyisoprene, polybutadiene and combinations thereof.

10. A process as claimed in claim 2, wherein said binder includes between about 5 volume percent and about 50 volume percent of said tackifier.

11. A process as claimed in claim 2, wherein said tackifier is selected from the group consisting of terpene and polyterpene resins, terpene phenolic resins, aliphatic petroleum hydrocarbon resins, rosins, rosin derivatives and combinations thereof.

12. A process as claimed in claim 2, wherein said binder further includes between about 1 volume percent and about 20 volume percent of a plasticizer.

13. A process as claimed in claim 12, wherein said plasticizer is selected from the group consisting of dibutyl phthalate, dihexylphthalate, triphenyl phosphate, (dipropylene glycol) butyl ether, diethyleneglycolmonoricinoleate and combinations thereof.

* * * * *